United States Patent [19]
Burckhardt et al.

[11] 3,779,331
[45] Dec. 18, 1973

[54] DEVICE FOR PREVENTION OF SPINNING OF THE DRIVEN WHEELS OF A MOTOR VEHICLE

[75] Inventors: Manfred H. Burckhardt, Waiblingen; Hans-Jörg Florus, Goeppingen; Horst Grossner, Geradstetten; Hellmut Krohn, Esslingen; Hermann Stein, Stuttgart, all of Germany

[73] Assignee: Daimler-Benz Aktiengesellschaft, Stuttgart-Unterturkheim, Germany

[22] Filed: Sept. 27, 1972

[21] Appl. No.: 292,784

[30] Foreign Application Priority Data
Sept. 28, 1971 Germany.............. P 21 48 303.4

[52] U.S. Cl......... 180/82 R, 303/21 EB, 188/181 C
[51] Int. Cl.......................................... B60t 8/06
[58] Field of Search................. 303/21 EB, 21 CG; 180/82 R, 105, 100, 54, 64; 188/181 C

[56] References Cited
UNITED STATES PATENTS
3,288,232  11/1966  Shepherd.................. 303/21 EB X
3,680,655  8/1972  Beyerlein................. 303/21 EB UX
3,260,555  7/1966  Packer...................... 303/21 EB
3,520,575  7/1970  Steigerwald............... 303/21 BE
3,503,654  3/1970  Stamm..................... 303/21 EB Primary Examiner—Allen N. Knowles
Assistant Examiner—Gene A. Church
Attorney—Paul M. Craig, Jr. et al.

[57] ABSTRACT

A system for preventing the spinning of the driven wheels of a motor vehicle, in which each wheel is equipped with a generator producing an electrical voltage proportional to the wheel rotational speed and in which the control voltage for the control of the driving or brake force is produced by a comparison of the voltage of a driven and of a non-driven wheel when exceeding a predetermined slippage threshold; the control voltage is obtained by feeding the voltages of the generators of the non-driven wheels to a respective differential amplifier while the voltages of the driven wheels are fed to the corresponding differential amplifier by way of a voltage divider whereby the ratio of division of the voltage divider is adjusted by a control device operated in dependence on the rotational speed of the corresponding non-driven wheel.

15 Claims, 1 Drawing Figure

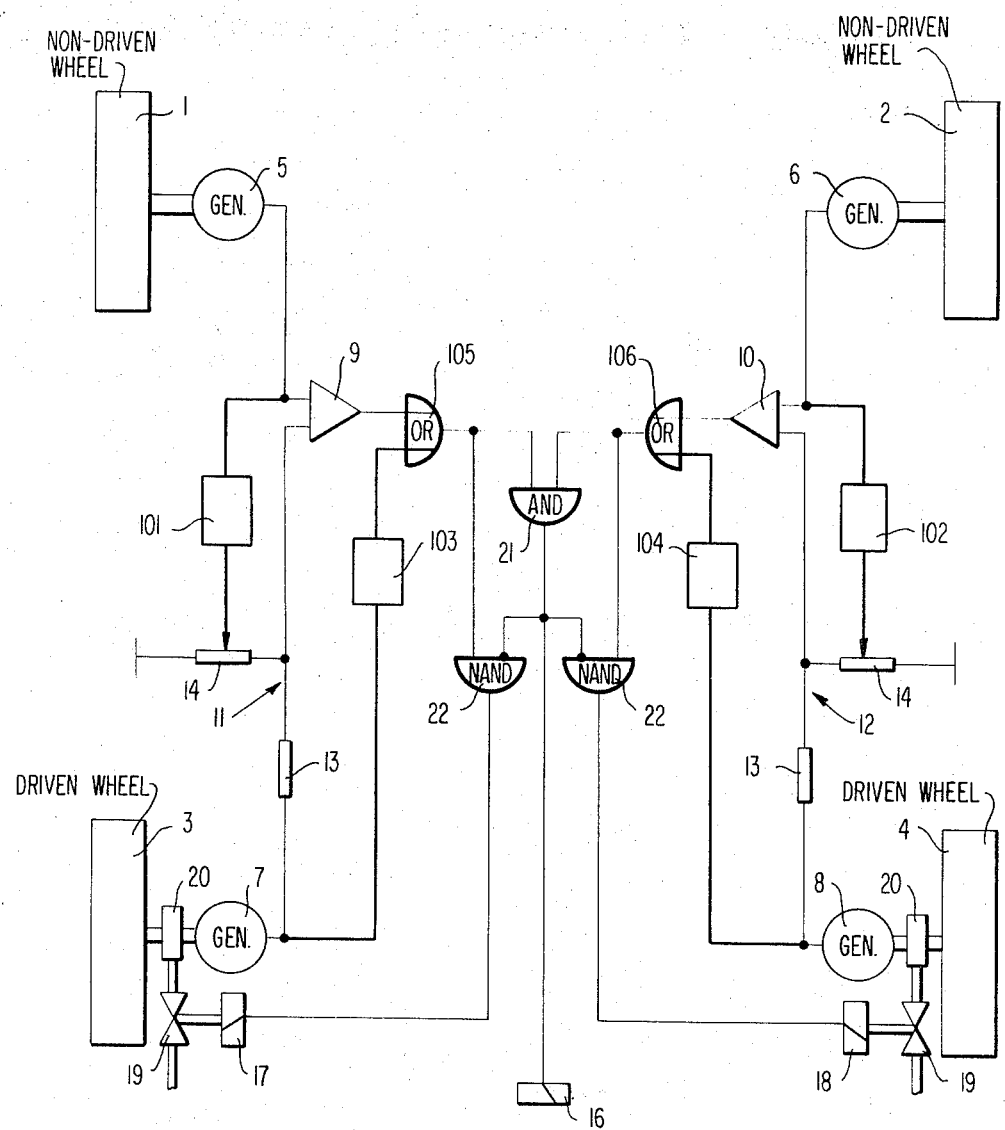

DEVICE FOR PREVENTION OF SPINNING OF THE DRIVEN WHEELS OF A MOTOR VEHICLE

The present invention relates to an installation for the prevention of the spinning of the driven wheels of a motor vehicle, in which each wheel is provided with a generator supplying an electrical voltage proportional to the wheel rotational speed, and in which a control voltage for the control of the driving or braking force is produced by a voltage comparison of a driven and of a non-driven wheel upon exceeding a predetermined slippage threshold, in that the voltages are fed to the inputs of two differential amplifiers whose outputs are connected to an actuating member decreasing the engine torque as also to an actuating member acting on the wheel brakes of the driven wheels, of the type disclosed in German Patent Application P 18 06 671.2, which corresponds to U.S. application Ser. No. 872,892, now Pat. No. 3,667,813 assigned to the assignee of this application and filed in the U.S. Pat. Office on Oct. 31, 1969, the subject matter of which is incorprated herein by reference to the extent necessary.

In the system as disclosed in the prior application, one starts with a predetermined slippage—for example, 15 percent —between the driven and non-driven wheels of the vehicle, whereby upon exceeding the same, the device engages and acts thereby on the brakes of the driven wheels or on the vehicle drive.

During the driving operation of the motor vehicle, the fixation of a predetermined slippage is realizable. However, during the starting when the driven wheel already rotates whereas the non-driven wheel still stands still, the slippage assumes for a brief period of time values of 100 percent.

With a predetermined slippage of, for example, 15 percent, the control installation would therefore commence to become operable already and interact during the starting, whence the vehicle would accelerate only very slowly.

It is the aim of the present invention to avoid this disadvantage and to enable a normal acceleration during the starting of the motor vehicle.

Consequently, it is proposed according to the present invention to connect control elements in the outputs of the generators of the non-driven wheels, by means of which the ratio of division of the voltage dividers determining the slippage threshold is adapted to be changed either in steps or continuously as a function of the vehicle velocity.

It becomes possible thereby to permit a large slippage during the starting, up to a predetermined starting velocity and to decrease the same to a predetermined value during a further velocity increase either in steps or continuously.

In order to prevent a spinning of the driven wheels during standstill of the motor vehicle, it is necessary to permit only a predetermined wheel acceleration whereby the installation engages again upon exceeding the same.

This is achieved according to the present invention in that differentiating elements are connected in the output of the generators of the driven wheels, in which voltages are produced proportional to the corresponding wheel accelerations and in which switching signals are triggered upon exceeding a predetermined value which, of equal rank to the output signals of the differential amplifiers, act on the actuating elements.

Accordingly, it is an object of the present invention to provide an installation for the prevention of the spinning of the driven wheels of a motor vehicle which avoids by simple means the aforementioned shortcomings and drawbacks encountered in the prior art.

Another object of the present invention resides in an installation for the prevention of the spinning of the driven wheels of a motor vehicle which permits normal acceleration of the vehicle yet limits the slippage of the driven wheels to a predetermined amount when driving above a certain vehicle speed.

A further object of the present invention resides in a system for preventing the spinning of the driven wheels of motor vehicles which permits a large slippage during the starting of the vehicle yet reduces this slippage to a predetermined value as the speed of the vehicle increases.

Still another object of the present invention resides in an installation for preventing the spinning of the driven wheels of a motor vehicle which does not limit the slippage of the driven wheels during the starting, yet prevents improper operation by limiting the rotational acceleration thereof.

These and further objects, features and advantages of the present invention will become more apparent from the following description when taken in connection with the accompanying drawing which shows, for purposes of illustration only, one embodiment in accordance with the present invention and wherein:

The single FIGURE is a schematic diagram of an installation for preventing the spinning of the driven wheels of a motor vehicle in accordance with the present invention.

Referring now to the single FIGURE of the drawing, the non-driven wheels 1 and 2 and the driven wheels 3 and 4 are each equipped with a generator 5, 6, 7, and 8, respectively, which supplies a voltage proportional to the wheel rotational speed of the corresponding wheel. The outputs of the generators 5 and 6 are connected directly with the inputs of the differential amplifiers 9 and 10 while the outputs of the generators 7 and 8 are connected with the inputs of the differential amplifiers 9 and 10 by way of voltage dividers generally designated by reference numerals 11 and 12. The outputs of the differential amplifiers 9 and 10 are fed by way of OR-elements 105 and 106 to an AND-element 21 and to two NAND-elements 22 which, on the one hand, are connected to an actuating element 16 decreasing the engine torque and, on the other, to actuating elements 17 and 18 acting on the wheel brakes 20. The actuating element 16 may be of any suitable type and may be incorporated into an electronic fuel injection system, known as such in the prior art and therefore not described in detail herein.

Control elements 101 and 102 are connected to the generators 5 and 6 of the non-driven wheels; the outputs of the control elements 101 and 102 lead to the resistances 14 of the voltage dividers 11 and 12. The resistances 14 may thereby be in the form of conventional potentiometers or other suitable known elements. Differentiating elements of conventional construction including a conventional threshold value-switching element 103 and 104 connected in the outputs thereof, are connected to the generators 7 and 8 of the driven wheels; the threshold value switching elements 103 and 104 are connected with their outputs to the inputs of the OR-elements 105 and 106.

The generators 5 to 8 produce voltages proportional to the wheel rotational speeds. For determining the slippage, the generators 5 and 7 as well as the generators 6 and 8 of a respective driven wheel 3 or 4 and of a respective non-driven wheel 1 or 2 of a corresponding vehicle side are connected to the inputs of a corresponding differential amplifier 9 and 10. The voltages produced by the generators 7 and 8 of the driven wheels 3 and 4 are applied to the inputs of the differential amplifiers 9 and 10 by way of the voltage dividers 11 and 12 having the resistances 13 and 14. The voltage dividers 11 and 12 are so constructed that the differential amplifiers 9 and 10 produce a signal only upon exceeding the permissive slippage in the driving operation, for example, of 15 percent.

From standstill up to a predetermined starting velocity, the voltage dividers 11 and 12 are so adjusted by the control elements 101 and 102 that the differential amplifiers 9 and 10 do not produce a signal.

However, in order to prevent the spinning of the driven wheels 3 and 4 during this operating condition, the voltages proportional to the rotational speeds of these wheels are differentiated in the differentiating elements 103 and 104 and thus supply a voltage proportional to the wheel accelerations which are compared with an adjustable value in a conventional threshold value switching device whereby a signal is triggered upon exceeding the same.

After surpassing the starting velocity, the voltage dividers 11 and 12 are controlled back either stepwise or continuously to their original position.

In normal driving operations, the use of the wheel acceleration is operable in such a manner that already during the tendency for spinning, the system becomes operable to act in the manner described above.

During the spinning of one wheel, the installation acts on the brakes 20 of this wheel whereas during the simultaneous spinning of both wheels, the system acts on the vehicle drive by way of the actuating element 16, to decrease the torque output of the engine.

Since the generators 5 to 8 as well as the various elements indicated schematically in the drawing are known as such in the prior art, involve commercially available elements, and form no part of the present invention, a detailed description thereof is dispensed with herein.

While we have shown and described only one embodiment in accordance with the present invention, it is understood that the same is not limited thereto but is susceptible of numerous changes and modifications as known to those skilled in the art, and we therefore do not wish to be limited to the details shown and described herein but intend to cover all such changes and modifications as are encompassed by the scope of the appended claims.

What we claim is:

1. An installation for preventing the spinning of driven wheels of a motor vehicle in which each wheel is provided with a generator means supplying an electrical voltage proportional to the wheel rotational speeds, and in which means are provided for producing a control voltage by comparison of the voltages of a driven and non-driven wheel upon exceeding a predetermined slippage threshold, the means including two differential amplifier means having inputs and outputs, the voltages produced by the respective driven and non-driven wheel being applied to the inputs of a respective differential amplifier means and the outputs thereof being operatively connected to actuating means decreasing the engine torque as also acting on wheel brake means of the driven wheels, characterized by voltage divider means operable to determine the predetermined slippage threshold, and control means connected to the output of the generator means of the non-driven wheels and operable to vary the ratio of division of the voltage divider means determining the slippage threshold in dependence on the vehicle velocity.

2. An installation according to claim 1, characterized in that the control means adjust the voltage divider means in steps as a function of the vehicle velocity.

3. An installation according to claim 2, characterized in that the control means adjust the voltage divider means continuously as a function of the vehicle velocity.

4. An installation according to claim 1, characterized in that the voltage divider means are operatively connected between the output of the generator means of the driven wheels and a respective one of the inputs of the corresponding differential amplifier means.

5. An installation according to claim 4, characterized in that differentiating means are connected in the outputs of the generator means of the driven wheels for producing voltages proportional to the corresponding wheel accelerations and including means for triggering switching signals upon exceeding a predetermined value which act upon the actuating means.

6. An installation according to claim 5, characterized in that the switching signals act on the actuating means with equal rank to the output signals of the differential amplifier means.

7. An installation according to claim 6, characterized in that the output of a respective differential amplifier means and of a differentiating means is applied to an OR-element, the outputs of the OR-element for each vehicle side being fed to a respective input of an AND-element, and the output of the AND-elements being operatively connected to the actuating means for controlling the engine torque.

8. An installation according to claim 7, characterized in that two NAND-elements are provided having two inputs each, one input being connected with the output of the respective OR-element of the corresponding side and the other input thereof being connected to the output of the AND-element, and the output of the NAND-element being connected with the actuating means for the wheel brakes of the driven wheel of the corresponding side.

9. An installation according to claim 8, characterized in that the control means adjust the voltage divider means in steps as a function of the vehicle velocity.

10. An installation according to claim 8, characterized in that the control means adjust the voltage divider means continuously as a function of the vehicle velocity.

11. An installation according to claim 1, characterized in that differentiating means are connected in the outputs of the generator means of the driven wheels for producing voltages proportional to the corresponding wheel accelerations and including means for triggering switching signals upon exceeding a predetermined value which act upon the actuating means.

12. An installation according to claim 11, characterized in that the switching signals act on the actuating means with equal rank to the output signals of the differential amplifier means.

13. An installation according to claim 11, characterized in that the output of a respective differential amplifier means and of a differentiating means is applied to an OR-element, the outputs of the OR-element for each vehicle side being fed to a respective input of an AND-element, and the output of the AND-elements being operatively connected to the actuating means for controlling the engine torque.

14. An installation according to claim 13, characterized in that two NAND-elements are provided having two inputs each, one input being connected with the output of the respective OR-element of the corresponding side and the other input thereof being connected to the output of the AND-element, and the output of the NAND-element being connected with the actuating means for the wheel brakes of the driven wheel of the corresponding side.

15. An installation according to claim 14, characterized in that the switching signals act on the actuating means with equal rank to the output signals of the differential amplifier means.

* * * * *